United States Patent Office 3,316,216
Patented Apr. 25, 1967

3,316,216
POLYFLUOROKETONE/1,2-EPOXIDE COPOLYMERS AND METHOD FOR MAKING SAME
Frank Shumate Fawcett, Wilmington, and Edward George Howard, Jr., Hockessin, Del., assignors to E. I. du Pont de Nemours and Company, Wilmington, Del., a corporation of Delaware
No Drawing. Filed Mar. 11, 1964, Ser. No. 351,217
23 Claims. (Cl. 260—63)

This invention relates to, and has as its principal objects provision of, a novel process for making polymers and/or dioxolanes, depending upon the conditions, and the novel polymers made thereby.

The process of the present invention is an addition reaction involving a polyfluoroketone of the Formula I, $X-CF_2-CO-CF_2-X'$, and an epoxide of the Formula II,

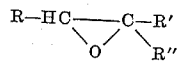

the X's and R's of the reactants being as defined below, carried out in the presence of a catalytic amount of any of certain catalysts in the temperature range from $-80°$ to $+200°$ C. and preferably in the substantial absence of water and other protonated solvents.

The reaction of the process is accomplished quite simply by mixing reactants (I) and (II) at a temperature in the range noted, i.e., $-80°$ to $+200°$ C., in the presence of the catalyst. At a temperature below $100°$ C., a polymeric product is obtained, admixed with some dioxolane as the higher temperatures are approached. A preferred temperature for the production of polymer in optimum amount is $-40°$ C. to $+30°$ C. At temperatures above $100°$ C., dioxolanes are produced in increasing amounts, preferred temperatures for dioxolane formation being $125°$ to $150°$ C.

The reaction for polymer formation can be schematically written as follows:

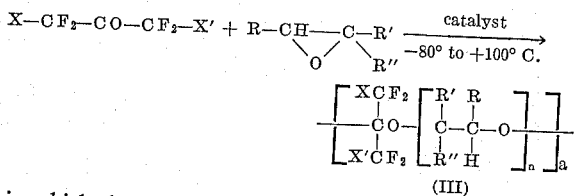

in which the X's and R's are as indicated below, n is at least 1 and a is at least 3. These polymers are the composition-of-matter aspect of the invention.

It will be understood that the formula on the right in the above equation may, or may not, correctly represent the structure of the polymeric product and is not, therefore, to be taken as a limitation. The products are addition copolymers of the polyfluoroketone and epoxide in mole ratios which can vary from 0.01:1 to 1:1.

The physical properties of the polymer vary with composition. Lower molecular weight polymers may be sticky solids at ordinary temperatures (see Example 13, below), while the higher molecular weight polymers are generally firm solids capable of being formed into self-supporting films (see Examples 18 and 30, below). It is to be further understood that more than one epoxide or ketone, or more than one of both, can be polymerized together to form polymers containing more than two components. When another polymerizable component is included in the reaction mixture, e.g., a different polyfluoroketone or epoxide, the total amounts of polyfluoroketone or epoxide should be within the previously expressed ratios. These last-mentioned products fall within the scope of the invention (see Example 22, below).

The dioxolane-forming reaction which is competitive with that leading to polymer formation is restricted to monocyclic epoxides and involves reaction of one mole of the polyfluoroketone with one mole of monocyclic epoxide. The reaction can be schematically represented as follows.

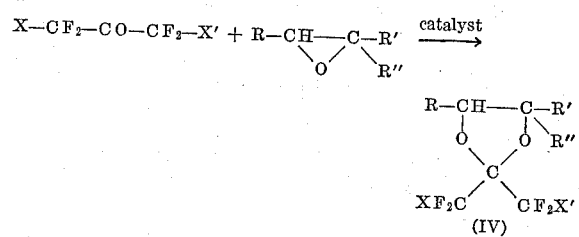

The dioxolanes (IV) are known compounds and, in themselves, form no part of this invention. The present process, however, is an improved method for producing the dioxolanes from readily available intermediates.

In the ketone reactants (I) and the products of the above reactions, X and X' may be the same or different and are, separately, hydrogen, halogen of atomic number 9–35, i.e., fluorine, chlorine or bromine, or polyfluoroalkyl of up to 18 carbons or, jointly, polyfluoroalkylene of 1 to 3 carbons which with the

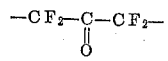

group forms a carbocyclic structure of 4–6 carbons. The formula of the cyclic ketones may be written as

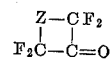

where Z is polyfluoroalkylene of 1–3 carbons. This cyclic structure, of course, is carried over into the polymeric product.

The ketones of Formula I are known compounds preparable by general methods, as shown, for example, in Lovelace et al., "Aliphatic Fluorine Compounds," Reinhold Publishing Co., pages 182–187 (1958), and U.S. Patents 3,091,643, 3,029,252 and 3,039,995. Specific polyfluoroketones include perfluoroacetone, 1H,3H-perfluoropropanone, 1-chloropentafluoropropanone, perfluoropentane-2-one, 9-bromoperfluorononane-4-one, perfluorododecane-5-one, 1H,7H-dodecafluoroheptane-3-one, 1,5 - dichloroperfluoropentane-3-one, 1,9-dibromoperfluorononane - 5-one, 1,17-dichloroperfluoroheptadecane-9-one, perfluorocyclobutanone, 3 - chloro-2,2,3,4,4-pentafluorocyclobutanone, 3 - bromo-2,2,3,4,4-pentafluorocyclobutanone, perfluorocyclohexanone, and the like.

In the epoxide reactants (II) and the products, R, R', and R'' can be the same or different and may be hydrogen; hydrocarbon, particularly alkyl of up to 18 carbons, alkenyl of up to 18 carbons, aryl of up to 14 carbons, aralkyl of up to a total of 12 carbons, cycloalkyl of up to a total of 7 carbons, alkoxyalkyl of up to a total of 18 carbons, aryloxyalkyl of up to a total of 14 carbons; cyano; haloalkyl of up to 18 carbons in which the halogen is of atomic number 9–35; hydroxyalkyl in which the alkyl group is of up to 18 carbons; carboxy; and alkoxycarbonyl, carbocyclooxyalkylenyl, carbacyl, carboxyalkylenyl, and alkoxy-carbonylalkenyl of up to a total of 18 carbons. R and R'' can also be joined in alkylene of 2 to 6 carbons (R''') which with the

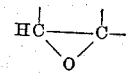

radical forms of a carbocyclic ring of 4 to 8 carbon toms. A separate formula for those reactants in which R and R" are joined can be written as

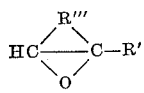

The preferred epoxides are those in which R, R' and R" are hydrogen, alkyl or alkenyl of up to 7 carbons, phenyl, cyclohexyl or aralkyl of up to 8 carbons, or those in which R''' forms with the

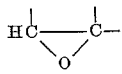

radical a carboxylic ring of up to 6 carbons.

Usable epoxides of Formula II include ethylene oxide,
1,2-epoxypropane,
1,2-epoxybutane,
2,3-epoxybutane,
2,3-epoxypentane,
2-phenyl-1,2-epoxypropane,
1,2-epoxydecane,
1,2-epoxyoctadecane,
2-methyl-4-phenyl-1,2-epoxybutane,
1,2-epoxycyclopentane,
1,2-epoxycyclohexane,
1,2-epoxy-3-methyl-cyclohexane,
1,2-epoxy-1-phenylethane,
3,4-epoxy-1-butene,
3,4-epoxy-1-octadecene,
3-methoxy-1,2-epoxypropane,
3-phenoxy-1,2-epoxypropane,
3-(2-methylethoxy)-1,2-epoxypropane,
4-hydroxy-1,2-epoxybutane,
2-butyl-1,2-epoxyhexane,
3-bromo-1,2-epoxypropane,
4-chloro-1,2-epoxybutane,
3-fluoro-1,2-epoxypropane,
1-cyano-1,2-epoxypropane,
ethyl-2,3-epoxybutanoate,
1,2-epoxydecanoic acid,
1,2-epoxypropanoic acid,
2-methyl-1,2-epoxypropanoic acid,
4-keto-2,3-epoxypentane, and the like. Silicon-containing epoxides can also be employed.

The process of this invention is restricted in use to certain catalysts of the anionic type and tertiary amines. Usable catalysts include alkyl sulfoxides in which the alkyl group is of up to 18 carbons; alkali metal fluorides, cyanides, cyanates and thiocyanates and alkoxides and acylates of up to 18 carbons, e.g., potassium, rubidium and cesium fluorides and cyanides, sodium cyanate, potassium thiocyanate, sodium ethoxide, potassium butoxide, cesium dodecoxide, and the like, potassium acetate, sodium propionate, cesium dodecanoate, rubidium stearate and the like; tetraalkyl-, trialkylaryl- and trialkylaralkyl-ammonium chlodires, cyanides and hydroxides having a total of up to 18 carbon atoms, e.g., trimethylphenylammonium chloride, triethylphenylammonium chloride, tetramethylammonium hydroxide, trimethylbenzylammonium chloride and tetrabutylammonium cyanide; pyridine and terteriary lower-alkyl amines such as trimethyl-, triethyl-, and tributylamine; and phosphine oxides.

The reactants may be employed in any proportions, the reaction generally taking place upon the simple mixture of the ketone and epoxide in the presence of the catalyst at the temperatures noted above and, usually at autogenous pressure. Pressure, however, is not a critical variable and the process can be conducted under externally applied pressures or under reduced pressures.

The amount of catalyst employed will generally be at least 0.001% by weight of the polyfluoroketone. Use of more than 5% by weight based on the polyfluoroketone has no practical advantage and this value therefore constitutes the useful upper limit of catalyst concentration. The nature of the epoxide and polyfluoroketone being reacted, and whether the process is being carried out in a batch or continuous manner will determine the time of reaction. In general, the time will vary from a few minutes to several days.

If either the polyfluoroketone or epoxide, or both, is liquid at reaction conditions, it is not necessary to employ a reaction medium. If a medium is used, however, it should be one which is unreactive with the reactants and reaction products under the conditions of reaction. Suitable media are the hexanes, heptanes, benzene, octanes, cyclohexane, methylcyclohexane, diethyl ether, dibutyl ether, dioxane, nitrobenzene, etc. The choice of reaction medium will depend upon the particular polyfluoroketone and epoxide being reacted. However, in order to obtain polymers of highest molecular weight it is important that the reaction be carried out under conditions which rigidly exclude the presence of moisture and other protonated solvents (see Example 30, below).

The copolymers of this invention are useful as coatings for flexible and rigid substrates to impart water-insensitivity to said substrates. Thus, they are useful as treating agents for paper or cloth to impart water-repellency thereto and to protect steel from corrosion; see for instance, Example 1C, below. The self-supporting films which can be formed from the higher molecular weight polymers have, of course, the known utilities of such films.

As initially produced, the copolymers of this invention contain hydroxyl end groups or the alkali metal or ammonium salts thereof, depending on the catalyst used. Improvement in such polymer properties as melting point and resistance to thermal degradation can be achieved by "end-capping" the polymers, i.e., by replacing the hydroxyl or salt end group with an ester or an ether group or a halogen.

Suitable end-capping can be accomplished by:

(1) Acylation of the polymer with an alkanoic acid, acid anhydride, acid halide or ketene with or without the aid of a catalyst;

(2) Heating the polymer with a phosphorus halide, e.g., $PCl_5$, $PCl_3$, $PBr_3$ or $PBr_5$, alone or in admixture with a phosphorus oxyhalide, e.g., $POCl_3$ or $POBr_3$ (preferred; see, for instance, Example 23, below);

(3) Treatment of the polymer with an orthoester;

(4) Treatment of the polymer with an acetal; and (5) Treatment of the polymer with an alkyl ester of a strong inorganic acid, e.g., dimethyl sulfate.

The conversion of the end group to an ester group can be achieved conveniently by reacting the copolymer in a liquid- or vapor-phase mixture with a carboxylic acid, acid anhydride, acid halide, or ketene, preferably in the presence of a tertiary amine acid-acceptor catalyst, for a period of time sufficient to esterify essentially all of the hydroxyl groups, and recovering the copolymer carboxylate. Suitable treating agents are alkanoic acids of 2–18 carbon atoms having at least one hydrogen on the carbon vicinal to the carbonyl carbon of the carboxyl group, e.g., acetic, propionic, butyric, dodecanoic and octadecanoic acids, and corresponding anhydrides or ketenes. The acid or other agent may be employed in large excess over that theoretically required to complete the reaction, e.g., in amount which can be from 1000 to 3000 moles per terminal hydroxyl group. Suitable tertiary amine catalysts are quinoline, pyridine, methylpyridine, dimethylcyclohexylamine, etc. The tertiary amine may be present in amount of from 1 mole percent to 100 mole percent of the anhydride, but there is nothing critical about this limit. The temperature and duration of the esterification are not critical. In general, temperatures of from 0° C. to 150° C. are suitable. Pressure, likewise, is not critical.

The treatment of the copolymer with a phosphorus halide and/or oxyhalide is carried out by direct contact generally under reflux conditions. In some cases, an inert reaction medium may be optionally employed to facilitate contact between the reactants. Use of an acid-acceptor, e.g., pyridine, is also optional.

The conversion of the end group to an ether group can be achieved by reaction of the copolymer with an alkyl ester of a strong inorganic oxyacid such as sulfuric or phosphoric acid, as illustrated in part of Example 1. Examples of suitable alkyl esters are dimethyl sulfate, methyl hydrogen sulfate, dibutyl sulfate, dioctyl sulfate, didodecyl hydrogen phosphate, trimethyl phosphate, and the like.

Conversion to an ether end group can also be effected by treatment with an orthoester or acetal of the general formula:

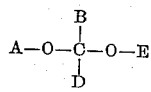

in which A and E are alkyl of 1 to 4 carbons, such as methyl, ethyl, and butyl; D is hydrogen, alkyl of 1 to 4 carbons or alkoxy of 1 to 4 carbons; and B is alkyl or alkoxy of 1 to 4 carbons. Illustrative useful orthoesters are trimethyl orthoformate, triethyl orthoacetate, triethyl orthoformate, tetramethyl orthocarbonate, etc. Useful acetals are methylethyl formal, methyl n-propyl formal, n-butyraldehyde diethyl acetal, n-butyraldehyde di(n-butyl)acetal, and the like.

A wide variety of process conditions are effective for the formation of ether groups. Thus, they may be formed by intimately contacting the copolymer and etherifying reagent at 50° to 175° C. in the presence or absence of a reaction medium which is unreactive with the polymer and etherifying reagent. Suitable media are dimethyl formamide, halogenated phenols, e.g., o-chlorophenol, etc.

There follow some examples which illustrate but do not limit the invention. In these examples, pressures are autogenous unless otherwise noted.

sealed. The charge in the sealed reactor was held at 25° C. for two days, followed by 9 hours at 90° C. Thereafter, the reaction mixture was allowed to cool to ambient temperature, the reactor opened, and the contents filtered to remove the treated polymer. The treated polymer was washed successively with diethyl ether and acetone-water. The washed, treated polymer was dried and found to weigh 9.6 g. The thermal stability of the treated and untreated polymers is summarized in the table below.

| Temp. (° C.) | Percent Weight Loss Untreated Polymer | Percent Weight Loss Treated Polymer |
|---|---|---|
| 22–50 | 0 | 0.3 |
| 50–200 | 0.8 | 0.0 |
| 200–300 | 3.7 | 0.7 |
| 300–350 | 22.0 | 21.1 |

The untreated polymer melted at 133° to 166° C., whereas the polymer which had been treated with dimethyl sulfate, i.e., end-capped, melted at 169° C. The sticking temperature of the untreated copolymer was 120° to 153° C. and that of the treated polymer, 162° C.

C. Untreated, powdered, hexafluoroacetone/ethylene oxide copolymer, prepared as in part A, above, was sprinkled on paper and the coated paper was then heated at 150° C. and 3000 lbs./sq. in. pressure. The paper thus obtained was not wet by water and when subjected to extraction by the common organic solvents retained its water-repellency. This property of the hexafluoroacetone/ethylene oxide copolymer is quite surprising because homopolymers of ethylene oxide are sensitive to moisture and very soluble in water while polymers containing pendent —$CF_3$ groups are very soluble in the common organic solvents. This experiment, however, demonstrates that the hexafluoroacetone/ethylene oxide copolymer is capable of imparting permanent water-repellency to paper.

*Examples 2–12*

Table I, below, is a summary of a series of experiments carried out following the procedure of Part A of Example 1, the catalysts in the left column of the table being substituted for the cesium fluoride of the example.

TABLE I

| Example | Catalyst | Mg. | Hexafluoroacetone, ml. | Ethylene Oxide, ml. | Temp., °C. | Time, hrs. | Copolymer | Yield Weight, g. |
|---|---|---|---|---|---|---|---|---|
| 2 | NaCN | 50 | 1 | 1 | 0 | 24 | White solid | 2.5 |
| 3 | NaOCH$_3$ | 50 | 1 | 1 | 0 | 24 | do | 2.3 |
| 4 | (CH$_3$)$_3$COK | 50 | 1 | 1 | 25 | 48 | do | 2.1 |
| 5 | (CH$_3$)$_2$SO | 50 | 1 | 1 | 25 | 48 | do | 2.0 |
| 6 | CH$_3$CO$_2$K | 50 | 3 | 1.4 | 25 | (¹) | do | 5.7 |
| 7 | Et$_4$N$^+$CN$^-$ | 50 | 3 | 1.4 | 25 | 1 | do | 5.7 |
| 8 | KCNO | 50 | 3 | 1.4 | 25 | 48 | do | 2.2 |
| 9 | KCNS | 50 | 3 | 1.4 | 25 | 48 | do | 2.5 |
| 10 | Et$_4$N$^+$Cl$^-$ | 50 | 3 | 1.4 | 0 | 0.7 | do | 6.2 |
| 11 | C$_6$H$_5$N$^+$(CH$_3$)$_3$Cl$^-$ | 50 | 3 | 1.4 | 25 | 72 | do | 3.7 |
| 12 | KF | 50 | 2 | 1.2 | 0 | 24 | do | 3 |

¹ 1 week.

*Example 1*

A. To a previously dried glass tube employed as a reactor there was added 25 mg. of cesium fluoride. The tube was cooled to −78° C., 2.5 ml. of ethylene oxide and 5 ml. of hexafluoroacetone were added thereto and the reactor was sealed. The charged reactor was permitted to warm to 0° C. and kept at 0° C. for three days. The reactor was opened and placed under vacuum for one hour. It was then brought to atmospheric pressure and the contents were removed and washed successively with acetone, acetone-water, and acetone. The product was dried to yield 8.5 g. of polymer.

B. At the conclusion of an experiment identical to the above, the reaction product was exposed to a nitrogen atmosphere while still in the glass reactor. There was then added 15 ml. of dimethyl sulfate and the reactor

*Example 13*

A. Following the procedure of Example 1(A), a charge consisting of 50 mg. of cesium fluoride, 1 ml. of hexafluoroacetone and 1 ml. of 1,2-epoxypropane was held at 0° C. for three days. The viscous oil which formed was dissolved in ether and the solution washed with water. The ether was removed by vacuum evaporation and the residue heated at 100° C. and 0.2 mm. pressure. The product obtained was a water-white, transparent, sticky polymer which weighed 1.5 g. This polymer did not flow at 25° C. It analyzed:

Calculated for a 1:1 copolymer (C$_6$H$_6$F$_6$O$_2$)$_n$: F, 51.0%. Found: F, 51.19%.

B. A similar product was obtained after a reaction time of one month at 25° C., sodium cyanide being employed as the catalyst in place of cesium fluoride. The opolymer obtained was worked up as above and found ） have an inherent viscosity of 0.02 as a 0.5% solution 1 acetone at 25° C., which corresponds to an approximate 1olecular weight of 1000–2000.

C. Example 13(A) was repeated using 1,2-epoxycyclohexane in place of 1,2-epoxypropane. There was obtained 1 g. of polymer which was solid at 25° C. but sticky at 100° C. This product analyzed 35.96% F, which corresponds to [$(C_3F_6O)(C_6H_{10}O)_{1.65}$]$_n$.

Example 14

Following the procedure of Example 1(A), but employing a charge consisting of 50 mg. of cesium fluoride and 1 ml. each of hexafluoroacetone and ethylene oxide, there was obtained 2.8 g. of a white polymer. Transparent hard films were pressed from part of this polymer at 3000 lbs./sq. in. at 25° C. The polymer was purified before pressing by suspending it in tetrahydrofuran, stirring for one hour at 25° C., filtering, resuspending in tetrahydrofuran and water, and drying at 100° C. and 0.2 mm. pressure. This copolymer analyzed: C, 28.83%; H, 2.26%; and F, 54.52%. This corresponds to a 1:1 copolymer of the formula $(C_5H_4F_6O_2)_n$.

The above copolymer is insoluble at 25° C. and 60° C. in hexafluoroacetone hydrate, in sec.-hexafluoropropanol, in sec.-hexafluoropropanol containing a small amount of triethylamine, and in dichlorotetrafluoroacetone hydrate, perfluoroacetic acid, formic acid, ethanol, chloroform, tetrahydrofuran, acetone, ethyl acetate, methyl ethyl ketone, and dimethylformamide.

Infrared analysis showed strong O-F absorption at 8.18, 8.19 and 8.95μ (doublet).

The X-ray powder diffraction pattern of the copolymer, indicative of a high order of crystallinity, is set forth in Table II. The data were obtained by the Debye-Scherrer method with a North American Philips unit, using copper Kα-radiation filtered through nickel to give an effective wave length of 1540 A. units. In this method, the sample is finely ground and packed into a capillary tube which is mounted in a camera having a 114.6 mm. diameter. In the table, I refer to the observed intensity values and $d$ to the interplanar spacings expressed in angstrom (A.) units. The letter S designates the strongest line recorded, $M_1$, $M_2$ and $M_3$ are lines of medium intensity, the order of intensity decreasing with increasing numerical sequence, F means that the line is faint, and V that it is very faint.

TABLE II

| I | d | I | d |
|---|---|---|---|
| $M_2$ | 8.185 | $M_3$ | 2.864 |
| $M_3$ | 6.651 | $M_3$ | 2.786 |
| S | 5.604 | $M_3$ | 2.569 |
| $M_1$ | 5.181 | $M_3$ | 2.402 |
| $M_2$ | 4.691 | $M_3$ | 2.336 |
| F | 4.055 | $M_3$ | 2.210 |
| $M_3$ | 3.798 | F | 2.083 |
| $M_3$ | 3.490 | F | 1.963 |
| $M_3$ | 3.324 | F | 1.806 |
| V | 3.035 | | |

Example 15

Twenty-five grams of hexafluoroacetone, 7 g. of ethylene oxide, and 1.5 ml. of pyridine were placed in a 240-ml. Hastelloy ® C-lined vessel and the charge was heated at 50° C. for two hours, at 75° C. for two hours, and at 100° C. for 10 hours. The reactor was allowed to cool, opened, and the contents were discharged. There was obtained 31 g. of crude hexafluoroacetone/ethylene oxide copolymer in the form of a black soft grease. The infrared spectrum of this product showed absorption at 3.3μ (CH) and in the 7 to 9μ region (C-F and/or C-O). A portion of the copolymer, after trituration with pentane and drying in vacuum, gave a solid with a molecular weight of 1162 and 945 (B.P. in acetone). A solution of the copolymer in acetonitrile showed a fluorine n-m-r resonance, indicating the presence of CH$_3$ groups (+510 cps. from $CFCl_2CFCl_2$ reference at 56.4 mc.).

Example 16

Twenty grams of hexafluoroacetone, 12 g of 1,2-epoxycyclohexane, and 1.0 ml. of triethylamine were charged (N$_2$ atmosphere) into a precooled Hastelloy® C-lined reactor. The mixture was heated at 50° C. for five hours and at 75° C. for eight hours to give 22 g of a white, brittle, solid hexafluoroacetone/1,2-epoxycyclohexane copolymer.

A 3.15 g. portion of the copolymer was crushed in a mortar, extracted with hot dimethyl formamide (soft and plastic when hot) and washed sequentially with water and with absolute ethanol. The washed, dried copolymer weighed 2.65 g. and was a white powder which was pressed at 75–125° C. to an opaque self-supporting film. The copolymer was soluble in toluene to give a viscous solution which showed a fluorine n-m-r resonance in the CF$_3$ region and from which pliable films could be cast.

*Analysis.*—C, 63.25%; H, 9.26%; F, 7.87%; M.W., 1540, 1270 (B.P. in benzene).

Example 17

Twenty-one grams of hexafluoroacetone, 5 g. of 1,2-epoxycyclohexane, and 0.5 ml. of triethylamine were charged into a precooled Hastelloy® C-lined reactor. The mixture was heated and maintained at 50° C. for five hours and at 75° C. for eight hours. There was obtained 9 g. of a white flaky copolymer and some liquid. A 5.5 g. portion was evacuated to give 5 g. of a moist soft white solid product which was extracted with N,N-dimethylformamide on a steam bath. The washed hexafluoroacetone/1,2-epoxycyclohexane copolymer, after cooling, was crushed and washed successively with cold and hot water, followed by absolute alcohol. The dried copolymer was a finely divided white powder weighing 2.75 g. It was soluble in toluene and could be cast into pliable films from the solution. Nuclear magnetic resonance (n-m-r) showed presence of fluorine in the CF$_3$ region.

*Analysis.*—F, 7.75%; M.W., 1305, 1325 (B.P. in benzene).

Example 18

Into a 145 ml. Hastelloy® C-lined reactor was charged 0.9 g. of finely divided cesium fluoride. The vessel was closed, cooled in a solid carbon dioxide-acetone mixture and evacuated. To the cold reactor was added 6 g. of ethylene oxide and 20 g. of hexafluoroacetone. The reactor and contents were heated at 50° C. for three hours, at 75° C. for three hours, and at 100° C. for eight hours. After cooling and venting volatile material, there was obtained 21 g. of a tan-colored solid copolymer. The copolymer was mixed in a high-speed mechanical mixer with benzene and the insoluble granular solid dried and washed with water to give, after drying, 8.30 g. of a pale yellow solid copolymer of ethylene oxide and hexafluoroacetone. Pressing at 80°–100° C. gave transparent clear films. The copolymer was soluble in acetone and its infrared spectrum showed bands at 3.37 and 3.45μ (saturated CH), strong absorption in the 8 to 10μ region (C-O and/or C-F), with no evidence for C=O absorption. The inherent viscosity (0.1% in acetone, 25° C.) was 0.01.

*Analysis.*—C, 27.25%; H, 1.86%; F, 52.47%.

Example 19

A reactor was charged at −78° C. with 1.5 ml. (0.03 mole) of ethylene oxide, 50 mg. of cesium fluoride, and 3.2 ml. (0.03 mole) of chloropentafluoroacetone,

(passed through activated alumina before use) at 0° C. The mixture was cloudy and no polymer formed even after 24 hours. The reactor was opened, and the contents transferred by vacuum technique to another dry reactor containing 50 mg. of fresh cesium fluoride. After 20 hours at 0° C. solid formed. The reactor was opened and there were recovered 3.4 g. of a white solid chloropentafluoroacetone/ethylene oxide copolymer, M.P. 150° C.

Analysis.—Calcd. for 1:1 copolymer $(C_5H_4ClF_5O_2)_x$: C, 26.7; H, 1.77; F, 41.8; Cl, 15.6. Found: C, 25.82; H, 1.93; F, 36.03; Cl, 14.93.

Example 20

A charge consisting of 3.7 g (0.03 mole) of 1,2-epoxy-4-vinylcyclohexane, 3 ml. of hexafluoroacetone, and 50 mg. of cesium fluoride was placed in a glass reactor and the charged reactor stored at 0° C. for two days. Two layers formed and finally the product became very viscous. The product was dissolved in diethyl ether, washed with water and dried with anhydrous magnesium sulfate. The diethyl ether was removed by evaporation under reduced pressure and dried at 100° C. and 0.2 mm. pressure. The product was a plastic hexafluoroacetone/1,2-epoxy-4-vinylcyclohexane copolymer which was soluble in ether and analyzed 13.80% F.

Example 21

A reaction mixture consisting of 7.4 g (0.03 mole) of 1-(trimethoxysilyl)-2-(3′,4′-epoxycyclohexyl)ethane,

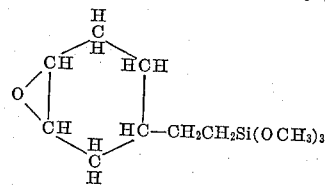

3 ml. of hexafluoroacetone, and 50 mg. of cesium fluoride was placed in a reactor. At 0° C., two layers formed, the upper one of which rapidly became viscous. The mixture was then allowed to stand at 0° C. for two days. Upon the removal of unreacted hexafluoroacetone, a rubbery hexafluoroacetone/1-(trimethoxysilyl)-2-(3′,4′-epoxycyclohexyl)ethane copolymer resulted which crosslinked in about 15 minutes' exposure to air to a hard, intractable product. The copolymer analyzed: F, 6.89%; Si, 10.80%, which corresponds to a ratio of 1 hexafluoroacetone to 6.4 of 1-(trimethoxysilyl)-2-(3′,4′-epoxycyclohexyl)ethane.

Example 22

A reactor was charged at −78° C. with 3 ml. of hexafluoroacetone, 1 ml. of ethylene oxide, 1 ml. of 1,2-epoxypropane, and 50 mg. of cesium fluoride and stored at 0° C. for three days. The resulting solid product was dissolved in diethyl ether, the ether solution washed with water, and the ether removed by evaporation, eventually at a temperature of 100° C. and 0.2 mm. There remained a tacky solid, which analysis indicated to be a terpolymer.

Calcd. for 1:1 hexafluoroacetone/ethylene oxide copolymer: C, 28.82%; H, 2.26%; F, 54.27%
Calcd. for 1:1 hexafluoroacetone/1,2-epoxypropane copolymer: C, 32.2%; H, 2.68%; F, 51.19%
Found for this terpolymer: C, 30.66%; H, 2.48%; F, 51.99%.

Example 23

Following the procedure of Example 1, a copolymer was prepared from 4.9 g. (0.03 mole, 3 ml. at −78° C.) of hexafluoroacetone and 1.3 (0.03 mole) of ethylene oxide, using 50 mg. of potassium acetate ($KO_2CCH_3$) as catalyst, the mixture being maintained at 25° C. for one week.

A 2 g. portion of the hexafluoroacetone/ethylene oxide copolymer, prepared as above, was heated at reflux for 3.5 hours with 25 ml. of $PCl_3$. Another 2 g. portion of polymer was heated at reflux for 3.5 hours with 25 ml. of $POCl_3$ and 3 g. of $PCl_5$. Both polymers were collected by filtration, washed first with diethyl ether and then with an acetone/water mixture. The washed polymers were dried at 100° C. and 0.2 mm. pressure. The yield of $PCl_3$-treated polymer was 1.8 g. and of $PCl_5/POCl_3$-treated polymer 1.9 g. The treated, i.e., end-capped, polymers were subjected to thermogravimetric analysis as described by Vasallo, Anal. Chem. 33, 1823 (1961), with the results shown in the table below:

| | Untreated Polymer (Control) | Polymer Treated With | |
|---|---|---|---|
| | | $PCl_3$ | $PCl_5/POCl_3$ |
| Temp. for 5% loss in wt., ° C. | 320 | 367 | 364 |
| Melting point, ° C. | 174 | 180 | 180 |
| Dielectric constant | | 4 | |
| Resistivity, ohms-cm. | | $10^{15}$ | |

The above data show that end-capping of the copolymer with $PCl_3$ or with $PCl_5$ and $POCl_3$ improves its resistance to thermal degradation and increases its melting point.

Example 24

Tetraethylammonium chloride (0.5 g.) was placed in a Hastelloy® C shaker reactor. The reactor was cooled to −50° C. and evacuated and 110 g. of hexafluoroacetone and 29 g. of ethylene oxide were charged thereinto. The reactor was sealed and allowed to stand at room temperature for 72 hours. The reactor was opened and the contents discharged. Volatile products were removed at 50° C. under vacuum and the solid residue washed first with ether and then with a 1:1 mixture of acetone and water, giving a fluffy white hexafluoroacetone/ethylene oxide copolymer, M.P. 161–172° C. Treatment of the resultant copolymer with diethyl sulfate for two hours at 50° C. gave an end-capped product having a melting point of 185–188° C.

Example 25

Pyridine (0.5 g.) and 0.1 g. of water were placed in a Hastelloy® C shaker reactor. The reactor was then cooled to −50° C., evacuated, and 110 g. of hexafluoroacetone and 29 g. of ethylene oxide were charged thereinto. The reactor was sealed and heated at 120° C. for 12 hours. After cooling, the reactor was discharged and the contents distilled, giving a 98% yield of 2,2-bis(trifluoromethyl)-1,3-dioxolane, B.P. 103–105° C.

Example 26

A. A glass reactor was charged with 4.3 ml. (0.03 mole) of 3-phenoxy-1,2-epoxypropane, 50 mg. of cesium fluoride, and 3 ml. (0.03 mole) of hexafluoroacetone, sealed, and stored at 0° C. Initially the reaction mixture appeared in two layers, but on aging it became uniform in appearance and viscous in nature. The reaction mixture was dissolved in ether, the ether solution washed with water, and the washed ether solution dried over anhydrous magnesium sulfate. After filtering and removing the solvent, there remained 7 g. of a viscous, white, sticky polymer. This polymer analyzed: 32.00% F, which corresponds to a hexafluoroacetone/3-phenoxy-1,2-epoxypropane ratio of 1.3.

B. The above experiment was repeated with 1 ml. of 3,4-epoxybutene-1 in place of 3-phenoxy-1,2-epoxypropane. A pale viscous oil was obtained. This copolymer contained 32.21% F, corresponding to a hexafluoroacetone/3,4-epoxybutene-1 ratio of 1:2.7.

Example 27

A corrosion-resistant pressure vessel (240 ml. capacity) was charged with 20 g. of hexafluoroacetone, 10 g. of ethylene oxide and 1.0 ml. of triethylamine. The mixture was heated with agitation under autogenous pressure at 50° C. for five hours and at 75° C. for five hours. The vessel was cooled, vented, and the liquid residue (21 g.)

was removed. The liquid was fractionally distilled under reduced pressure to obtain, as the first fraction, 2.48 g. of 2,2-bis(trifluoromethyl)-1,3-dioxolane, boiling at 49.5–5.1° C./100 mm. and identified by infrared and nuclear magnetic resonance spectra. Higher boiling products were also obtained on evaporative distillation up to about 190° C./1 mm. Nuclear magnetic-resonance examination of these higher boiling products showed the presence of fluorine and hydrogen.

*Example 28*

A mixture of 31 g. of hexafluoroacetone, 10 g. of ethylene oxide, and 0.5 ml. of triethylamine was heated with agitation under autogenous pressure in a corrosion-resistant pressure vessel (240 ml. capacity) at 50° C. for 5 hours and at 75° C. for 10 hours. The vessel was cooled and vented and the liquid residue (14 g.) was collected. The residue was fractionally distilled under reduced pressure to obtain 3 g. of colorless 2,2-bis(trifluoromethyl)-1,3-dioxolane, B.P. 43° C./75 mm. There was also obtained 1.25 g. of a yellow oil, B.P. 120° to 140° C./ca. 1 mm., containing 47.11% F, M.W., 318, 316 (B.P. acetone), and 0.66 of a yellow oil, B.P. 140° to 180° C./ca. 1 mm., containing 43.84%, F, M.W. 429, 414 (B.P. acetone).

*Example 29*

A dry glass reactor was charged with 20 mg. of tetraethylammonium chloride and heated to 100° C. while being evacuated to 0.3 mm. of mercury pressure. There was then added 2.2 g. (0.03 mole) of 2-methyl-1,2-epoxypropane and 5 g. (0.03 mole) of hexafluoroacetone. The reactor was sealed and stored at 0° C. After two days at 0° C. and one day at 25° C., the reactor was cooled and opened. There resulted 5 g. of a mixture consisting of a powdered polymer and a grease. The reaction product was extracted with diethyl ether to give 0.6 g. of an ether-insoluble polymer which analyzed 7.04% fluorine. This corresponds to a copolymer containing about 5 mole percent of hexafluoroacetone.

*Example 30*

A glass reactor was charged with 3 mg. of tetraethylammonium chloride and heated with a smoky flame. Separate reactors, evacuated with a mercury diffusion pump to a pressure of $5 \times 10^{-5}$ mm. of mercury, were prepared and thereinto were condensed 3 ml. (0.03 mole) of hexafluoroacetone and 1.4 ml. (0.03 mole) of ethylene oxide free from water and oxygen. The three reactors were cooled with liquid nitrogen and re-evacuated to $5 \times 10^{-5}$ mm. of mercury. The reactor containing the catalyst under a vacuum of $5 \times 10^{-5}$ mm. of mercury was cooled in liquid nitrogen and hexafluoroacetone and ethylene oxide permitted to distill thereinto. The charged reactor was sealed and maintained at 0–15° C. for three days. There resulted 6 g. of a white polymer, the top portion of which was pressed to a transparent, slippery, dense, colorless, tough film.

The hexafluoroacetone used in the above experiment was prepared by converting commercial hexafluoroacetone to the 1.6 H₂O hydrate. To this hydrate was added 40° Baumé sodium silicate solution until the pH was from 2–2.5. The mixture was stirred and the hydrate distilled under vacuum into a flask cooled with ice. The ketone was liberated by adding it to a mixture of concentrated sulfuric acid and phosphorus pentoxide. The stream of hexafluoroacetone which was liberated was passed through a bed of molecular sieves of 5 A., condensed, and fractionated through a low-temperature Podbielniak still.

Since obvious modifications and equivalents will be evident to those skilled in the chemical arts, we propose to be bound solely by the appended claims.

The embodiments of the invention in which an exclusive property or privilege is claimed are defined as follows:

1. The process which comprises reacting:
   (a) at least one polyfluoroketone of the group consisting of

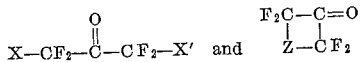

wherein X and X' are selected from the class consisting of hydrogen, fluorine, chlorine, bromine and polyfluoroalkyl of up to 18 carbons and Z is polyfluoroalkylene of 1–3 carbons; with
   (b) at least one epoxide of the group consisting of

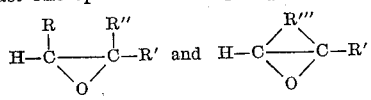

wherein R, R' and R" are selected from the class consisting of hydrogen; cyano; carboxy; alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkenyl of up to 18 carbons; aryl and aryloxyalkyl of up to 14 carbons; aralkyl of up to 12 carbons; and cycloalkyl of up to 7 carbons; and R''' is alkylene of 2–6 carbons;
   (c) at a temperature in the range −80° C. to +200° C.; and
   (d) in the presence of a catalytic amount of a catalyst of the group consisting of alkyl sulfoxides of up to 18 carbons; alkali metal fluorides, cyanides, cyanates and thiocyanates and alkoxides and acylates of up to 18 carbons; tetraalkyl-, trialkylaryl-, and trialkylaralkylammonium hydroxides, chlorides, and cyanides of up to 18 carbons; pyridine; tertiary lower-alkyl amines; and phosphine oxides;
   (e) the mole ratio of polyfluoroketone to epoxide being in the range 0.01:1 to 1:1.

2. The process of claim 1 wherein the temperature is in range from −40° to +30° C.

3. The process of claim 1 wherein the temperature is in the range from 125° to 150° C.

4. The process of claim 1 employing hexafluoroacetone.

5. The process of claim 1 employing chloropentafluoroacetone.

6. The process of claim 1 employing ethylene oxide.

7. The process of claim 1 employing 1,2-epoxypropane.

8. The process of claim 1 which comprises reacting, at a temperature in the range −80° to +100° C., hexafluoroacetone and ethylene oxide in the presence of an alkali metal fluoride.

9. The process of claim 1 which comprises reacting, at a temperature in the range −80° to +100° C., hexafluoroacetone and ethylene oxide in the presence of a tertiary lower-alkyl amine.

10. An addition copolymer of:
    (a) at least one polyfluoroketone of the group consisting of

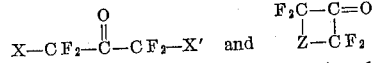

wherein X and X' are selected from the class consisting of hydrogen, fluorine, chlorine, bromine and polyfluoroalkyl of up to 18 carbons and Z is polyfluoroalkylene of 1–3 carbons; and
    (b) at least one epoxide of the group consisting of

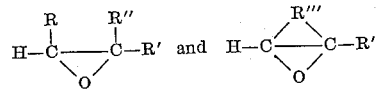

wherein R, R' and R" are selected from the class consisting of hydrogen; cyano; carboxy; alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkenyl of up to 18 carbons; aryl and aryloxyalkyl of up to 14 carbons; aralkyl of up to 12 carbons; and cycloalkyl of up to 7 carbons; and R''' is alkylene of 2–6 carbons;

(c) the mole ratio of polyfluoroketone to epoxide being in the range 0.01:1 to 1:1.

11. An addition copolymer of claim 10 end-capped by reaction with a di(lower alkyl) sulfate.

12. An addition copolymer of claim 10 end-capped by reaction with an alkanoic acid of 2–18 carbons having at least one hydrogen on carbon vicinal to the carbonyl carbon of the carboxyl group or the anhydride or ketene corresponding to such an acid.

13. An addition copolymer of claim 10 end-capped by reaction with a phosphorus chloride or bromide.

14. A film formed from a solid copolymer of claim 10.

15. A film of claim 14 formed from a solid copolymer of hexafluoroacetone and ethylene oxide.

16. An addition copolymer of claim 10 wherein the polyfluoroketone is hexafluoroacetone.

17. An addition copolymer of claim 10 wherein the polyfluoroketone is hexafluoroacetone and the epoxide is ethylene oxide.

18. An addition copolymer of claim 10 wherein the polyfluoroketone is hexafluoroacetone and the epoxide is 1,2-epoxypropane.

19. An addition copolymer of claim 10 wherein the polyfluoroketone is hexafluoroacetone and the epoxide is 1,2-epoxycyclohexane.

20. An addition copolymer of claim 10 wherein the polyfluoroketone is hexafluoroacetone and the epoxide is 1,2-epoxy-4-vinylcyclohexane.

21. An addition copolymer of claim 10 wherein the polyfluoroketone is hexafluoroacetone and the epoxide is 3-phenoxy-1,2-epoxypropane.

22. An addition copolymer of claim 10 wherein the polyfluoroketone is hexafluoroacetone and the epoxide is 2-methyl-1,2-epoxypropane.

23. An addition terpolymer of claim 10 wherein the polyfluoroketone is hexafluoroacetone and the epoxides are ethylene oxide and 1,2-epoxypropane.

References Cited by the Examiner
UNITED STATES PATENTS

| | | | |
|---|---|---|---|
| 2,807,646 | 9/1957 | Miller et al. | 260—593.5 |
| 2,917,546 | 12/1959 | Gordon et al. | 260—593.4 |
| 3,132,121 | 5/1964 | Pascal | 260—2 |

WILLIAM H. SHORT, *Primary Examiner.*

C. A. WENDEL, *Assistant Examiner.*